United States Patent [19]

Alheim

[11] Patent Number: 5,121,421
[45] Date of Patent: Jun. 9, 1992

[54] INTERACTIVE TELEPHONE COMMUNICATION SYSTEM FOR HEARING-IMPAIRED PERSON

[76] Inventor: Curtis C. Alheim, 14 Anne Dr., Schenectady, N.Y. 12303

[21] Appl. No.: 626,753

[22] Filed: Dec. 13, 1990

[51] Int. Cl.$^5$ .......................................... H04M 11/00
[52] U.S. Cl. ...................................... 379/52; 379/97; 340/825.19
[58] Field of Search ............... 379/52, 96–99, 379/396, 93; 340/825.19

[56] References Cited

U.S. PATENT DOCUMENTS

| | | | |
|---|---|---|---|
| 3,381,276 | 4/1968 | James | 340/172.5 |
| 4,012,599 | 3/1977 | Meyer | 379/52 |
| 4,268,721 | 5/1981 | Nielson et al. | 379/52 |
| 4,307,266 | 12/1981 | Messina | 379/52 |
| 4,320,256 | 3/1982 | Freeman . | |
| 4,426,555 | 1/1984 | Underkoffler | 379/52 |
| 4,677,659 | 6/1987 | Dargan | 379/97 |

FOREIGN PATENT DOCUMENTS

| | | | |
|---|---|---|---|
| 58-134568 | 8/1983 | Japan | 379/52 |
| 1-162059 | 6/1989 | Japan | 379/52 |

*Primary Examiner*—James L. Dwyer
*Assistant Examiner*—Wing F. Chan

*Attorney, Agent, or Firm*—Heslin & Rothenberg

[57] ABSTRACT

A novel interactive telephone communication system and method are provided which allow a hearing-impaired person, using a TDD, to send and receive information over a conventional two-way telephone subscriber network without communicating directly with another person. The hearing impaired person communicates over the subscriber network with a TDD coupled directly or indirectly to the network. The automated processing system includes a receiving circuit coupled to the network to receive communication signals from the hearing-impaired caller and processing means for processing a received communication signal according to a predefined control matrix. The processing means includes retrieval means for selectively retrieving one of a plurality of separately addressed TDD displayable messages stored in an associated computer database. Transmitting means are also provided for sending a retrieved TDD displayable message to the callers TDD for display. Depending upon the embodiment, the communication signal received by the system can comprise either a conventional touch-tone type telephone signal, a rotary type telephone signal or a TDD (e.g., Baudot) coded signal. A related processing method is also disclosed.

30 Claims, 6 Drawing Sheets

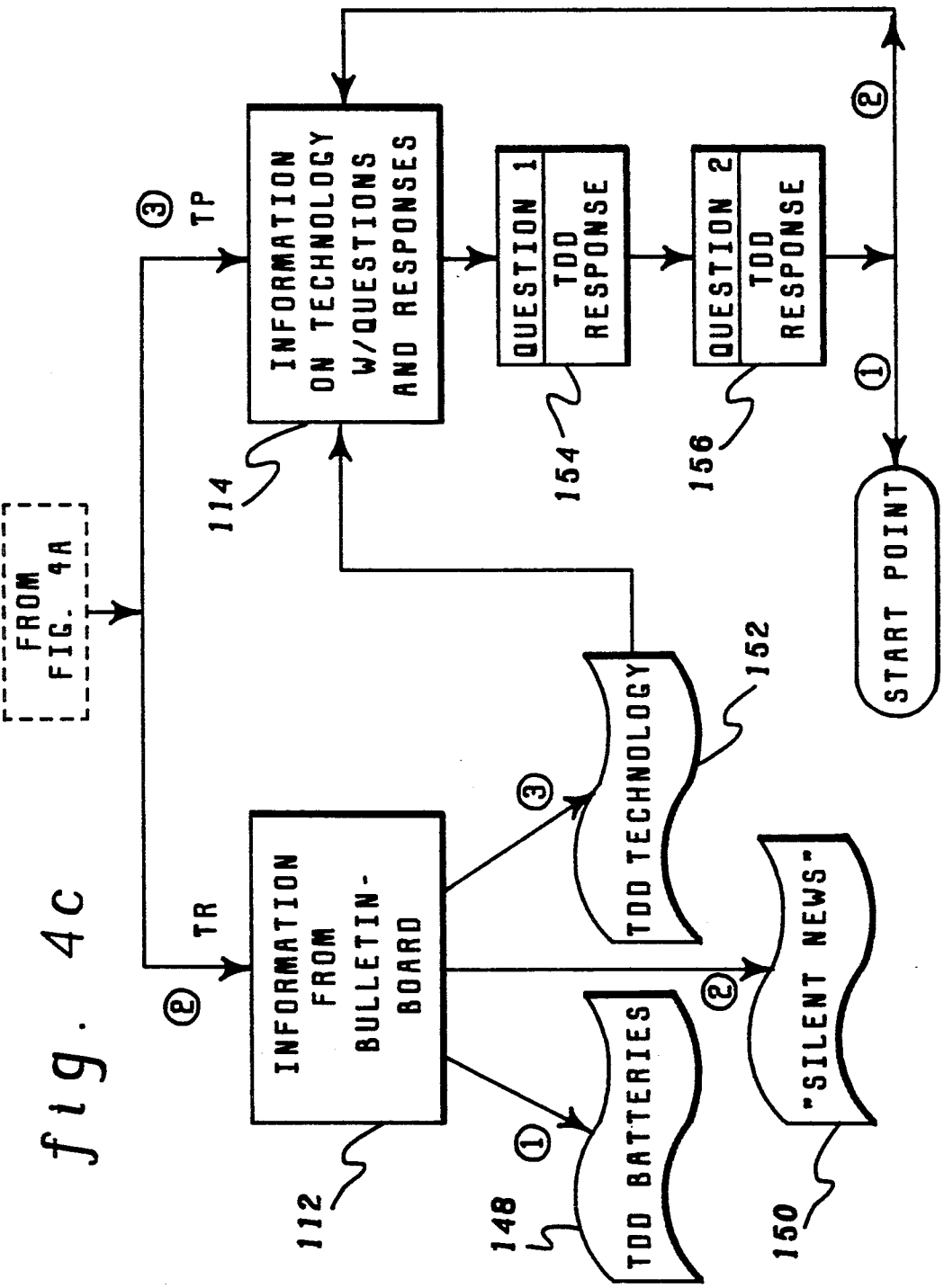

INTERACTIVE TELEPHONE COMMUNICATION SYSTEM FOR HEARING-IMPAIRED PERSON

BACKGROUND OF THE INVENTION

1. Technical Field

The present invention relates to telephone communications and, more particularly, to a novel interactive telephone communication system and method which allow a hearing-impaired person, using a TDD, to send and receive information over a two-way telephone subscriber network without communicating directly with another person.

2. Description of the Prior Art

Two-way telephone systems, which allow national and worldwide communication between individuals, normally provide for reception and output of sound energy. Because of this, a hearing-impaired person was for a long period prevented from communication over this network. In relatively recent years, however, technology has evolved which allows a deaf individual to communicate over the telephone subscriber network. Specifically, teletype/telecommunication devices for the deaf (TDDs) are now readily available, and many public and private organizations have special telephone numbers for hearing-impaired individuals to call which are devoted exclusively to telecommunications using TDD equipment, such as a relay service. A TDD unit conventionally communicates with another TDD unit using specially coded tone signals, e.g., Baudot and like codes. When a Baudot signal is received, the TDD equipment converts the signal into a visual format for display to the hearing-impaired person. In this manner, two hearing-impaired individuals are able to communicate directly using an existing telephone subscriber network as the carrier.

Increasingly, there is a trend in both the public and private sector towards streamlining the handling of incoming telephone calls by the use of pre-recorded interactive voice systems. Verbal interrogation systems, or verbal multiple choice response systems are well known, such as exemplified by the system described in U.S. Pat. No. 4,320,256 and the patents cited therein. However, such interactive voice systems obviously terminate communication for a hearing-impaired person. For example, since the deaf person is unable to hear the verbal instructions he cannot route his own call to an appropriate electronic mailbox or extension.

The present system, therefore, is designed to address this deficiency of existing interactive telephone interrogation technology and provide a deaf individual with the same access to automated attendant, "audio" text retrieval, transaction processing, etc., as that now enjoyed by hearing individuals.

SUMMARY OF THE INVENTION

Briefly described, the present invention comprises in one aspect an interactive telephone communication system designed to be connected to a two-way telephone subscriber network for automated processing of communication signals from a hearing-impaired person communicating therewith over the subscriber network via a TDD coupled to the network. The system includes a receiving circuit coupled to the network to receive communication signals from the hearing-impaired caller and processing means for processing a received communication signal according to a predefined control matrix. The processing means includes retrieval means for selectively retrieving one of a plurality of separately addressed TDD displayable messages stored in an associated computer database. Transmitting means are also provided for sending a retrieved TDD displayable message to the caller's TDD for display. A first transmitted message is predefined to include an initial control option to which the hearing-impaired caller responds by transmitting a predefined communication signal to the system. Depending upon the embodiment, the communication signal can comprise either a conventional touch-tone type telephone signal, a rotary type telephone signal or a TDD coded signal.

In one specific embodiment, the hearing-impaired caller's TDD is coupled to a conventional touch-tone type telephone and the telephone is connected to the subscriber network. In this embodiment, the communication signals comprise DTMF telephone signals generated via the touch-tone type telephone. As further enhancements, the messages stored in the associated system computer database are coded in Baudot for display on a caller's TDD. The transmitting and receiving means of the system include an analog-to-digital, digital-to-analog (A/D, D/A) converter interface for converting DTMF telephone signals to digital signals for processing by the processing means and for converting a retrieved TDD displayable message from a digital signal to an analog tone signal for transmission over the network to the caller's TDD. Specific circuitry for storing the TDD displayable messages in the computer database is provided. Lastly, the system also preferably includes switching means for routing a telephone call between one of a plurality of extensions, wherein most of the extensions have a TDD unit coupled thereto.

In another embodiment, the caller's TDD is coupled to either a conventional rotary type or touch-tone type telephone, which is connected to the network. In this embodiment, the communication signals received by the system comprise either rotary telephone signals, DTMF telephone signals or TDD displayable signals and the system further includes a dependent voice recognition card for converting a received rotary telephone signal and/or a received TDD displayable signal into a DTMF telephone signal. The DTMF telephone signal is then processed according to the predefined control matrix in a manner similar to the touch-tone type telephone embodiment of the system. Similar enhanced system features to those summarized above are also provided with this system embodiment.

The present invention comprises in a second aspect an automated method implemented at a central location which is coupled to a two-way telephone subscriber network for interactively responding to a telephone call from a hearing-impaired person communicating therewith over the telephone subscriber network using a TDD coupled to the network. The method includes the steps of: receiving at the central location a communication signal from the hearing-impaired caller; transmitting a TDD displayable message to the caller's TDD as an acknowledgement of connection to the central location and transmitting a first TDD displayable control option to the caller's TDD to which the caller responds by generating a predefined communication signal for transmission over the network to the central location; automatically processing a received communication signal (representative of a selected control option) according to a predefined control matrix, the processing of a selected option including retrieving one of a plurality of separately addressed digitally encoded TDD displayable signals for transmission to the caller's TDD over the network, the retrieved signal consisting either of a TDD displayable message or a second TDD displayable control option; and transmitting the retrieved TDD displayable signal over the network to the caller's TDD for display. Enhanced method processing steps are also described and claimed herein.

The interactive telephone communication system (and related method) of the present invention provides a hearing-impaired caller with substantially the same automated telephone processing and information options as those now enjoyed by hearing persons, including automated attendant, voice mail (i.e., TDD-Mail), "audio" text retrieval, transaction processing, and database searching, etc. The system is also advantageously implementable with commercially available technologies.

BRIEF DESCRIPTION OF THE DRAWINGS

These and other objects, advantages and features of the present invention will be more readily understood from the following detailed description of certain preferred embodiments thereof, when considered in conjunction with the accompanying drawings in which:

FIGS. 4a–4c depict a processing control overview for one embodiment of the present invention.

DETAILED DESCRIPTION OF PREFERRED EMBODIMENT

Figure 1:
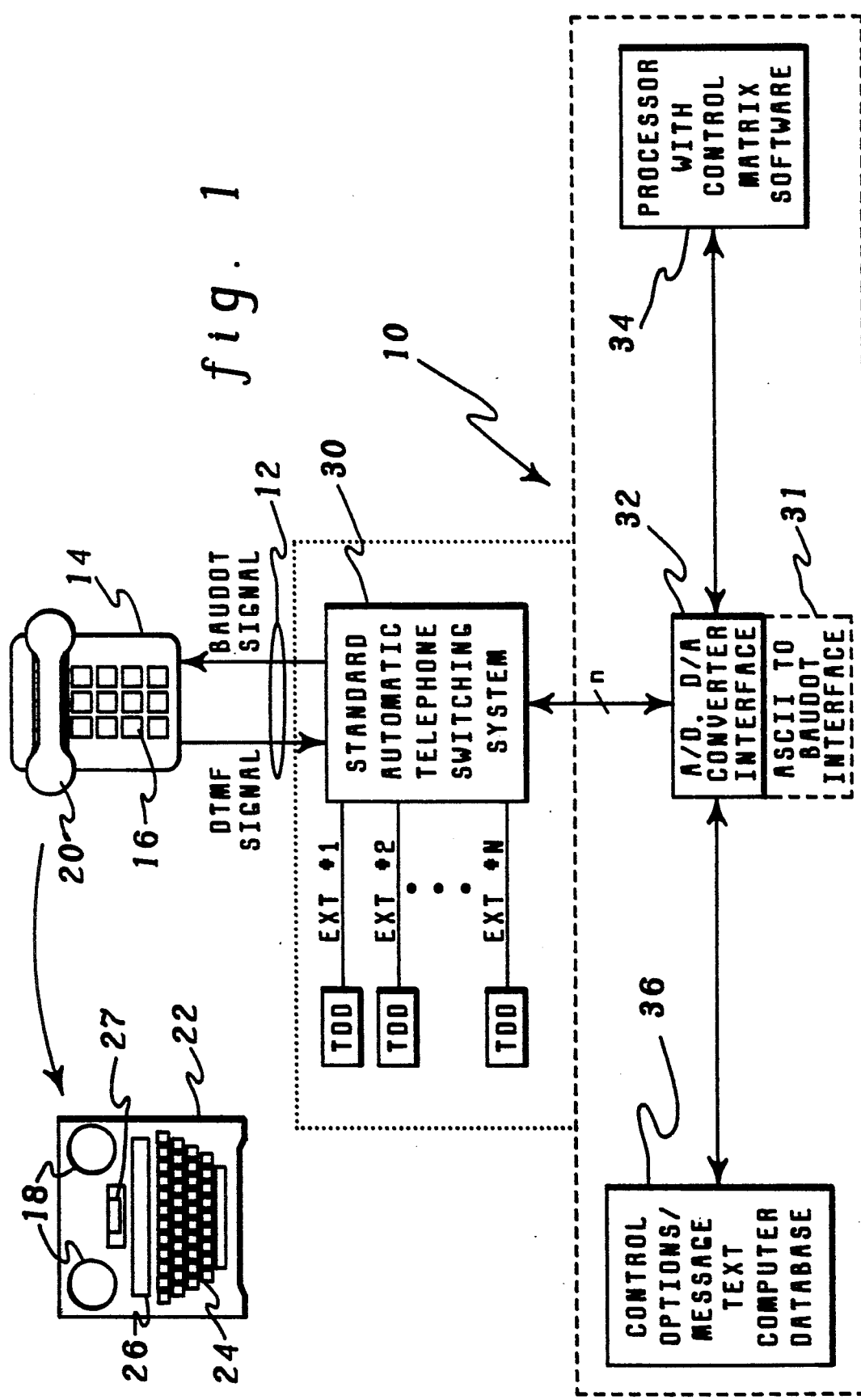
FIG. 1 is a functional block diagram of one preferred embodiment of the system of the present invention useful for hearing-impaired individuals communicating therewith via a conventional touch-tone type telephone, which is used to control the system.

Referring now to the drawings in detail and initially to FIG. 1 thereof, one presently preferred embodiment of the hearing-impaired interactive telephone communication system of the present invention, generally denoted 10, is shown in block diagram form. System 10 is coupled to a conventional two-way telephone subscriber network 12 which includes at least one touch-tone type telephone 14 coupled thereto. Telephone 14 comprises a conventional touch-tone type telephone, such as available from AT&T, which includes a tone generator for selectively transmitting a plurality of unique frequencies separated by tone signal outputs over the two-way telephone subscriber network 12 and a key pad 16 which is conventionally connected to the tone generator for selecting the unique tone signal outputs to be transmitted over telephone subscriber network 12. More detailed information on the functioning of conventional touch-tone telephone 14 is available in the open literature; for example, see the discussion thereof provided by Freeman in U.S. Pat. No. 4,320,256, the entirety of which is hereby incorporated herein by reference. For purposes of the present invention it is sufficient to note that telephone 14 communicates over the two-way telephone subscriber network with standard dual-tone multi-frequency (DTMF) signals.

Coupled to telephone 14, e.g., by acoustic coupling through acoustic couplers 18 and telephone handset 20, is a teletype or telecommunications device for the deaf (herein referred to as a TDD 22). TDD 22 can comprise any commercially available TDD which allows hearing-impaired individuals to communicate over a two-way telephone subscriber network. Two principal manufacturers/marketers of TDD equipment for the deaf are Ultratec of Madison, Wisc. and Krown Research, Inc. of Culver City, Calif. The present invention does not depend upon the particular type of TDD coupled to telephone 14.

TDD 22 includes a key pad 24 and a visually perceptible display 26, e.g., an LED display. In certain models, a hard copy printer 27 is also available. As is well known, unit 22 is conventionally used to communicate with another TDD (not shown) via a special code (e.g., Baudot, and more recently, ASCII) which when received is converted into a readable message and presented on display 26. In operation, a hearing-impaired individual places a call to another individual who also has a TDD by using the conventional touch-tone telephone and once connection is established with the telephone call recipient, communication thereafter is through the TDD units and, in particular, their keyboards and associated displays.

The improvement of the present invention primarily resides in an automated telephone attendant system for a central location. For purposes of the present invention, the central location (e.g., a public agency or private business) represents one of the remote subscribers in the two-way telephone subscriber network 12 with the system 10 subscriber preferably having a unique dialing code for enabling selective connection of the subscriber to any particular telephone caller in the telephone subscriber network 12. A plurality of telephone callers may typically be accommodated by the central location subscriber at substantially the same time.

As noted, FIG. 1 depicts one preferred embodiment of the present invention. In this embodiment, system 10 includes an automatic telephone switching system 30 connected to network 12 and a plurality of telephone extensions, EXT #1, EXT #2, . . . , EXT #N, therefrom. Preferably, each extension EXT #1, EXT #2, . . . , EXT #N, has a TDD coupled thereto for communicating with a non-hearing caller using TDD unit 22. Switching system 30 is well known in the open literature and comprises any conventional electronic automatic telephone switching system for routing the various calls to the subscribers throughout the network dependent on the unique dialing code input to the switching system by the telephone subscribers. The functioning of the telephone switching system 30 is well understood by those of ordinary skill in the art. Any standard electronic automatic telephone switching system 30 may be employed in system 10 of the present invention. Typically, system 30 will include a standard private branch exchange (PBX) which is coupled to the telephone subscriber network 12. The lines around switching system 30 vary somewhat from those around the remainder of system 10 because depending upon the implementation, call switching or forwarding may be unneeded, e.g., if only database or account searching capabilities are desired (as discussed further below).

Coupled to switching system 30 on the extension side is a telephone interface, herein referred to as A/D, D/A converter interface 32. Converter interface 32 may comprise any commercially available telephone interface card. One preferred such card is manufactured by Dialogic Corp. of Parsippany, N.J. 07054, and marketed as a Dialogic D41A communications card. Converter interface 32 transforms analog tone waveforms into digital signals, and preferably to discrete binary form for processing/storage. Pursuant to this embodiment, converter 32 transforms received DTMF signals into digital form for processing and converts stored messages from digital form to TDD receivable form, e.g., ASCII to Baudot (i.e., via interface 31), as described further below. Further, the referenced Dialogic interface is capable of accommodating multiple communications simultaneously, as is the rest of system 10. Also, those skilled in the art will be able to readily accomplish conversion of ASCII stored messages to Baudot signals using the above-referenced Dialogic interface and appropriate system 10 software.

Coupled to converter 32 is a processor 34 and an associated database storage 36. Processor 34 comprises any mini- or microcomputer based machine which contains automated telephone attendant application software, including an appropriate processing control matrix. A preferred application software package is marketed by Microlog of Germantown, MD 20874, as Microlog Application Software for a Voice Interrogation Telephone System. One possible processor logic flow is described in detail below with reference to FIGS. 4a–4c. Also, an example of a specific message matrix for the referenced Microlog Software is set forth in Appendix A, along with examples of actual corresponding TDD messages therefor in Appendix B. (Examples of standard abbreviations used by hearing-impaired individuals when communicating TDD equipment are provided in Appendix C hereof.)

Continuing with FIG. 1, computer database 36 preferably comprises a hard disk drive having up to hundreds of hours of message storage (e.g., 600–800 megabytes). The large data storage in system 10 is necessary to accommodate the TDD displayable messages, e.g., messages converted from ASCII to, or coded directly in Baudot. (Storage of Baudot messages requires 3–4 times the amount of disk storage for the same message as voice systems; however, as noted, ASCII to Baudot conversion is possible to minimize disk storage space.) Contained in database 36 are various messages, such as those set forth in Appendix B, including control options and/or other message text which may be selectively retrieved for transmission to the hearing-impaired caller, i.e., depending upon the logic path of processor 34 within the control matrix of Appendix A (again, which is controlled by the caller through DTMF signals generated via telephone 14 and transmitted over network 12 to system 10). Unique to the present invention is the storage of TDD displayable messages, e.g., Baudot or other similar codes, for retrieval and transmission to a hearing-impaired caller through the control matrix (Appendix A) of processor 34. A retrieved message is transformed to analog form by converter 32 and then sent through switching system 30, network 12 and telephone 14 to TDD 22 where the series of coded tones is converted to digital code for printing of characters on display 26.

As described with reference to FIGS. 4a–4c, pursuant to the present invention, modules implemented in Baudot for access by the deaf caller preferably include automated attendant, "audio" text retrieval, transaction processing, voice mail and interface to a mainframe for database searching. Briefly, applications for the system include: automated job availability; information hotlines (e.g. transportation information); interactive educational programs; home shopping markets; emergency notification and community alert programs; health monitoring systems for independent living; preregistration of out patient health care; quality of care information; account balance and expiration dates; forms and publication requests; and school registration and course selection; etc.

Figure 2:
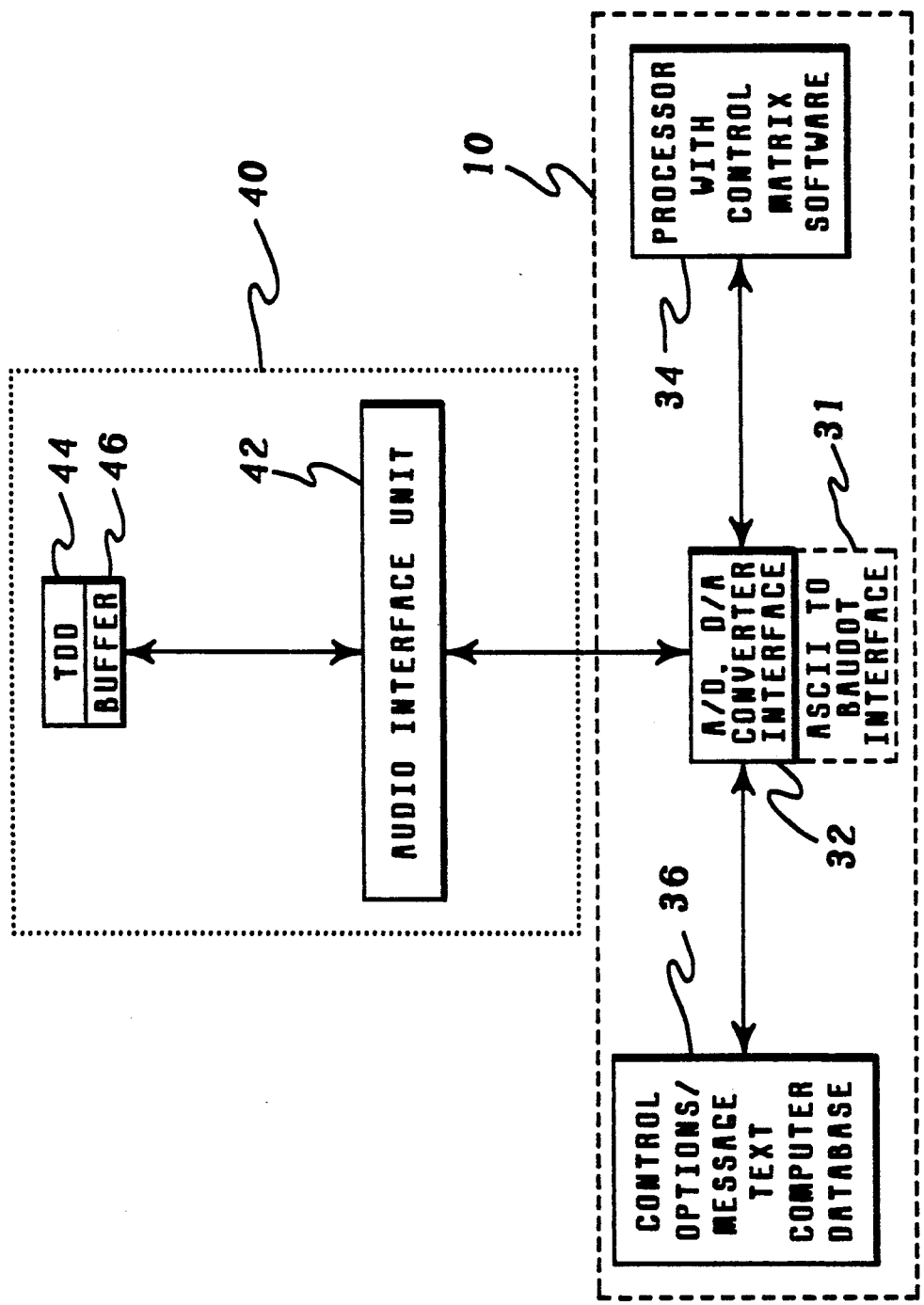
FIG. 2 is a block diagram representation of one circuit embodiment useful in explaining programming of TDD displayable messages within the system of FIG. 1.

One approach to storing of TDD displayable messages in system 10 is depicted in FIG. 2. TDD displayable messages (e.g., Baudot messages) are preferably input to system 10 via an input system 40 configured as shown. Input system 40 is coupled to converter interface 32 (and, in particular, to the above-referenced Dialogic interface card). The referenced Microlog automated telephone application software is then used, via processor 34, to store information on hard disk 36. System 40 includes an audio interface unit (AIU) 42 and a TDD 44. AIU 42 is connected directly to converter interface 32. One commercially available AIU 42 is manufactured and marketed by Microlog as an Audio Interface Unit.

TDD 44 preferably comprises a commercially available model having a memory buffer 46 therein. For example, the Ultratec TDD Superprint ES unit contains 8k of memory which allows transmission of prestored messages. Once initiated, transmission from such a TDD is at a constant 45.6 Baud, which is the standard rate for communications between TDD units in the United States. Thus, by predefining messages in memory buffer 46 it is possible to transmit a message to hard disk 36 at a standard rate for recordation, which means that whenever the message is retrieved by processor 34, it will be transmitted from system 10 at a uniform rate. Another option, but less preferred, is to use TDD equipment having no buffer memory in which case inputted messages are sent directly through the audio interface unit and converter interface 32 to the database exactly as typed. This means that any delays between typing of characters and/or errors in typing are stored to the hard disk substantially as they occur.

As Baudot encoded messages are transmitted to system 10 for storage, converter 32 digitizes the information and processor 34 stores it in database 36 at an application program defined location, e.g., refer to Appendix A. Again, in the preferred embodiment, system 10 utilizes the referenced Microlog Application Software which includes subroutines for storing messages. These same commands are advantageously used pursuant to the present invention to store Baudot coded messages which will subsequently be selectively retrieved and displayed on a caller's TDD.

Another approach to storing of TDD displayable messages in system 10 is to use a word processor to enter ASCII coded messages which are stored on hard disk 36 of system 10. ASCII to Baudot interface 31 then converts a retrieved message to TDD decodable tones for transmission over network 12 to a caller's TDD. As noted above, those skilled in the art can accomplish this conversion using the referenced Diologic card and appropriate software for processor 34.

Figure 3:
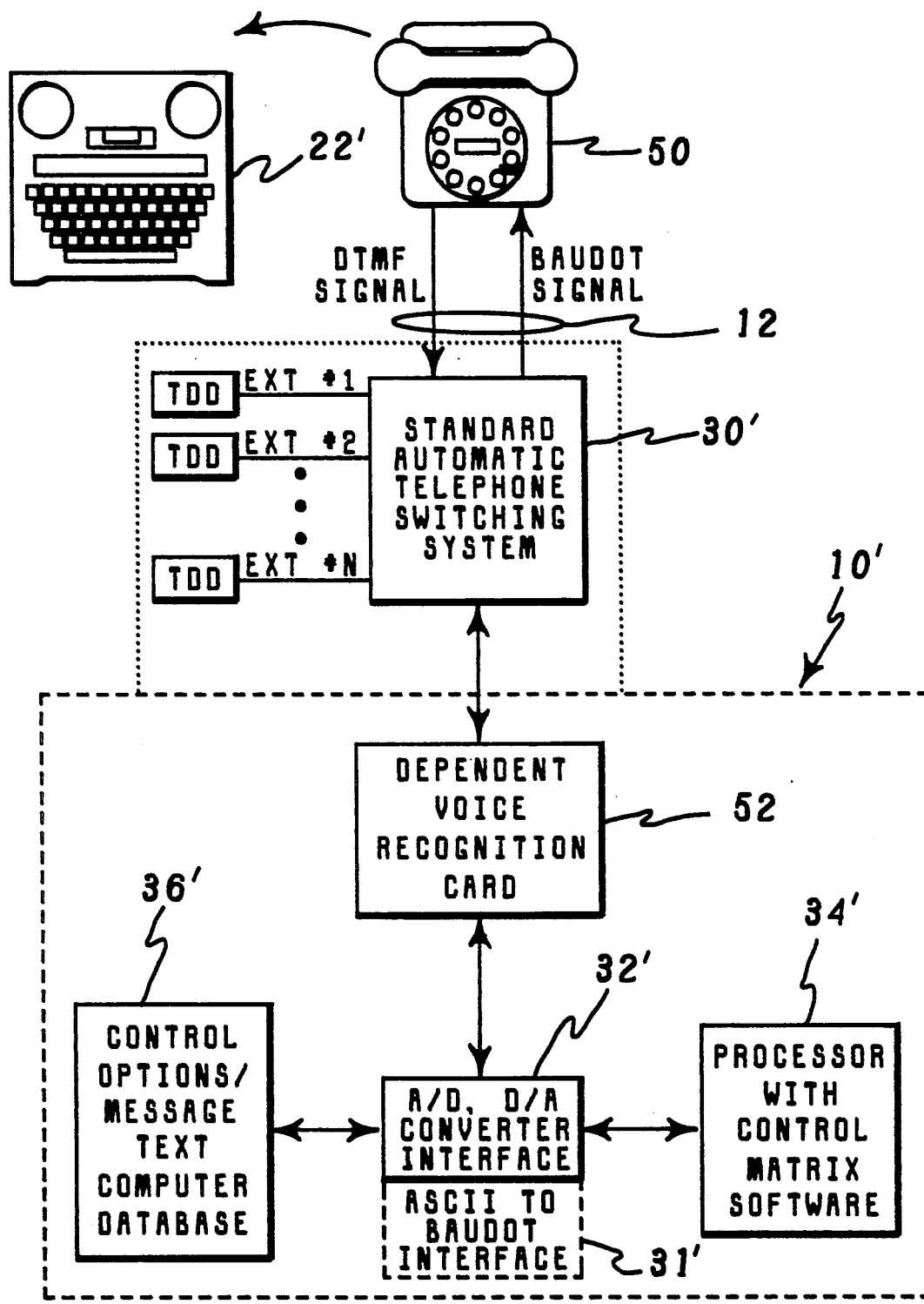
FIG. 3 is a functional block diagram of an enhanced embodiment of the system of the present invention capable of communicating with a hearing-impaired individual using a TDD with either a conventional rotary type telephone or a touch-tone type telephone thereto.

An alternate, enhanced embodiment of the hearing-impaired interactive telephone communication system, generally referred as 10′, is shown in FIG. 3. (In FIG. 3, similar structures to those introduced in FIG. 1 are referenced by similar numerals.) System 10′ is depicted in connection with a rotary telephone but is in fact more general than the touch-tone type telephone embodiment of FIG. 1 since the system can accommodate callers using either a conventional rotary type telephone or a touch-tone type telephone. In fact, with newer TDD equipment a separate telephone can be unnecessary since these TDD units can be coupled directly to the subscriber telephone network. As referenced below, system 10′ can also be programmed by one skilled in the art to readily handle these calls.

As depicted, system 10′ is coupled to the two-way telephone subscriber network 12, as is rotary type telephone 50. Telephone 50 again couples acoustically with a TDD 22′, which is identical to the unit described above with reference to FIG. 1. System 10′ includes a conventional, automatic telephone switching system 30′, A/D, D/A converter interface 32′ (and, possibly, ASCII to Baudot interface 31′), processor 34′ and computer database 36′, which contains stored control options and message text to be selectively retrieved and transmitted to the caller's TDD. Each of these components is substantially identical in this embodiment to the corresponding components described above with reference to the embodiment of FIG. 1.

Added to this system, however, is a dependent voice recognition card 52 which operates (where necessary) to convert rotary type telephone signals to DTMF signals before passing the signals to converter 32′. Once converted to DTMF signals the signal processing proceeds identically to that described above with respect to the DTMF signals generated by the touch-tone type telephone. In one embodiment, dependent voice recognition card 52 comprises that card marketed by Hager Telecommunications, Inc.. of Hopkinton, Mass. as Model No. RDD-2000. With this card, system 10′ is able to interactively respond to a hearing-impaired caller to the system using either a touch-tone type telephone or a conventional rotary dial telephone. Further, a person skilled in the art is able to modify the dependent voice recognition card marketed by Hager to recognize TDD coded signals (e.g., Baudot signals) and convert such signals into DTMF signals which may then be processed/stored by system 10′. In such a system, the caller's TDD would be used to directly control system 10′. Those skilled in the art will also recognize that retrieved information coded in Baudot can pass through card 52 by first delivering an appropriate code to disable the card.

An operational overview of the hearing-impaired telephone response system will now be described with reference to the control options or matrix presented in FIGS. 4a-4c. This particular matrix would be useful, for example, to a school and, in particular, to a school dedicated to teaching deaf students. It should be noted, however, that this overview is merely illustrative and is not critical to implementation of the present invention. Those skilled in the art will recognize that other flow diagrams may be constructed depending upon the central location requirements. In most, if not all cases, commercially available automated telephone attendant application software, such as the above-reference Microlog Application Software, allows ready configuration and/or reconfiguration of the control/message matrix to meet an organization's specific needs. (Further, applicant has discovered that such software when used in combination with a converter interface (described above) allows separate recordation of TDD displayable messages and, with relatively straightforward modification, conversion of ASCII signals to Baudot signals for transmission over the network.)

Figure 4A:
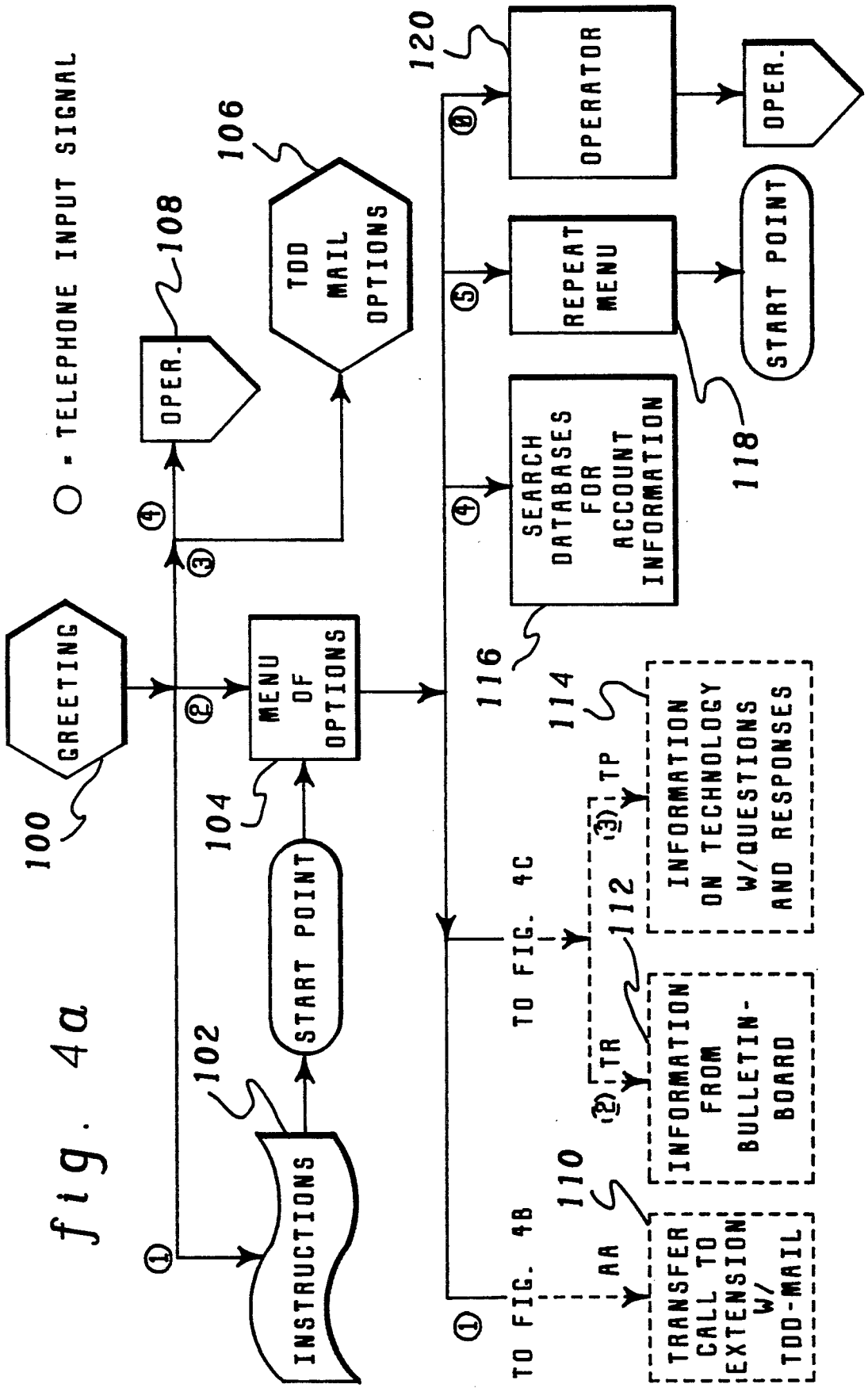

Referring now to FIG. 4a, a hearing-impaired caller initially receives a TDD displayable greeting after making connection to the system, i.e., after dialing the appropriate subscriber telephone number to access the system, 100 "Greeting." The greeting presents the caller with several control options, e.g., signal "1" (i.e., on the associated telephone) for system instructions, "2" for a menu of options, "3" for TDD mail options and "4" for operator assistance. Typically, in a first encounter a caller signals "1" for an overview of system functions, 102 "Instructions." Subsequent to display of the instructions, the system automatically transmits a menu of options, 104 "Menu of Options." This menu is also referred to as the "Start Point" to which the processor returns upon completing various functions within the routine. In the alternative, greeting 100 provides the caller with the choice to proceed directly to menu of options 104 by signaling "2". The third and fourth control choices provided to the caller are to proceed to TDD mail options, 106 "TDD Mail Options," or request operator assistance, 108 "OPER." TDD mail options would, for example, allow a caller who had a TDD mail extension within the system to retrieve any messages which may have been left by a TDD caller. Further information on typical TDD mail options is presented in Appendix D.

Figure 4B:
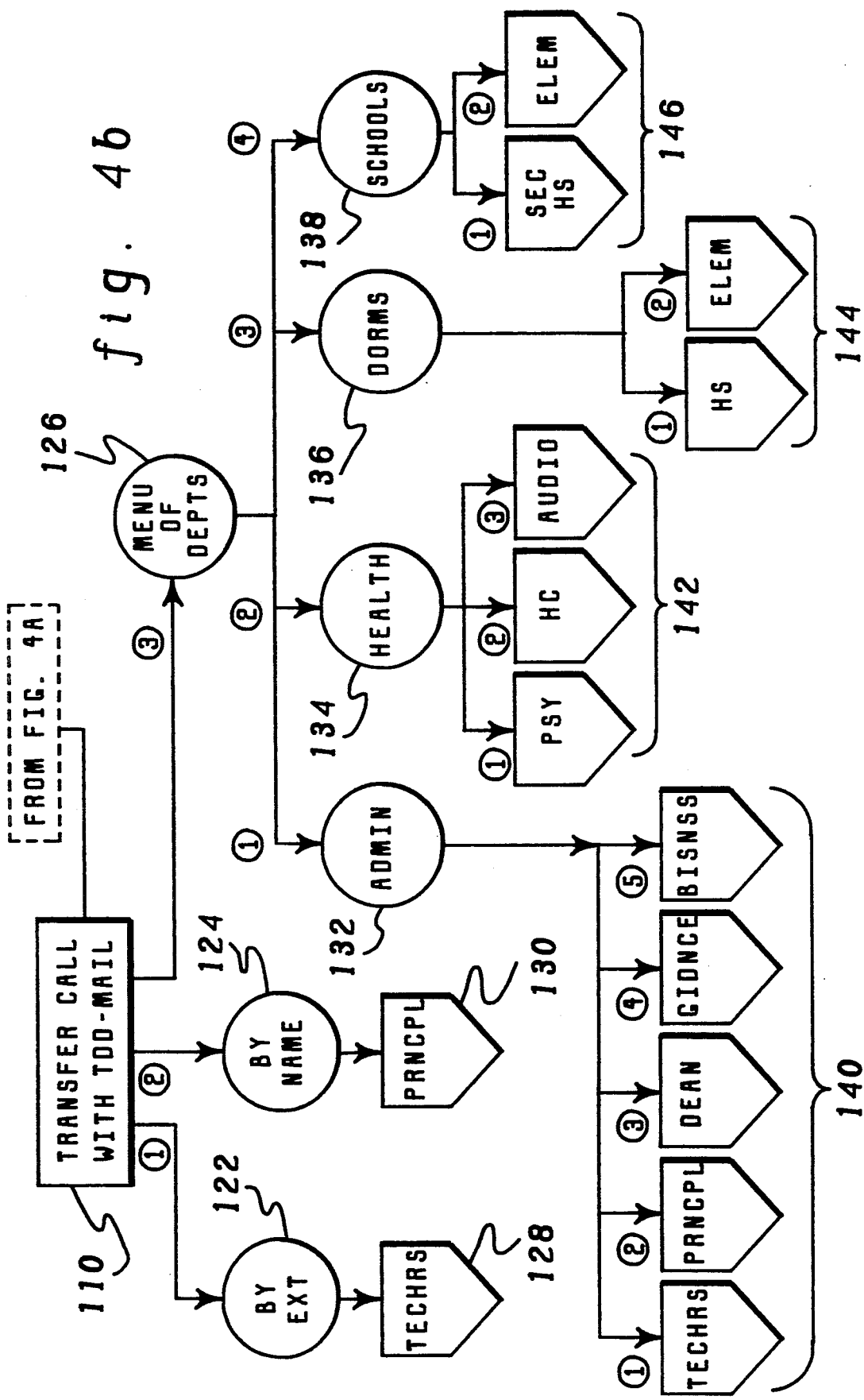

In this embodiment, menu of options 104 next presents the caller with a choice between automated attendant (AA), 110 "Transfer Call to TDD-Mail," text retrieval (TR), 112 "Information From Bulletin Board," transaction processing (TP), 114 "Information on Technology With Questions and Responses," account searching, 116 "Search Database For Account Information," (then return to menu of options (104)) 118 "Repeat Menu" (from which the processor returns to the "start point"), and request operator assistance, 120 "Operator." An example of one embodiment for automated attendant (AA) is provided in FIG. 4b, while examples of text retrieval (TR) and transaction processing (TP) are set forth in FIG. 4c.

From menu of options 104 (FIG. 4a), if the caller signals "1" then the call is transferred to an extension with TDD mail 110 (FIG. 4b), which in this embodiment presents the caller with three options, namely, transfer to a particular extension by extension number, 122 "By Extension," transfer to a particular extension number by name of person, or truncated version thereof, at that extension 124 "By Name," or view a menu of departments in order to route the call to a particular extension by subject matter, 126 "Menu of Depts." Assuming that the caller knows either the extension number or name of the person to be reached then the processor and switching system are instructed to transfer the call to, for example, the teacher's extension number, 128 "Techrs.," or to the principal's extension, 130 "Prncpl."

If the caller is unaware of the appropriate extension number, then menu of options 126 provides a choice between (again for example) administration, 132 "Admin.", health, 134 "Health", dormitories, 136 "Dorms", and school levels, 138 "Schools." If administration numbers are selected, i.e., by signaling "1" via the telephone, the caller is provided with a further option of transferring the call to a teacher, principal, dean, guidance counselor or business administration individual, generally denoted 140. Similarly, if the call involves a health issue the caller is transferred to a further menu providing a choice between the psychologist, health center or audiologist, 142. The dorms 136 and schools 138 options each provide a further choice between high school and elementary school phone numbers.

Should the caller have desired text retrieval (TR) or transaction processing (TP) then they would have followed the path from options display 104 (FIG. 4a) to information retrieval operation 112 and/or information interrogatories 114 (FIG. 4c). If text retrieval is desired, the caller is presented with a choice between, for example, information relating to TDD batteries, 148 "TDD Batteries," news for deaf individuals, 150 "Silent News," and the latest information on TDD technology in general, 152 "TDD Technology." In the control matrix embodiment depicted, the caller is also provided with an option to follow the path from TDD technology information to transaction processing (TP) 114. Transaction processing 114 typically includes a series of questions, subsequent each of which the caller is provided with a chance to respond thereto, the response being collected (for example) in a survey type format. After answering the applicable questions, the caller is presented with the further option of returning to the main menu or taking a different path within transaction processing (TP).

Again, those skilled in the art will recognize that various call flow diagrams may be constructed depending upon the particular central location requirements.

It will also be noted from the above discussion that the present invention comprises a novel method for automated processing of telephone calls from hearing-impaired individuals. Briefly, this automated processing method includes the steps of: receiving at a central location a communication signal from a hearing-impaired caller; transmitting a TDD displayable message to the caller's TDD as an acknowledgement of connection to the central location, along with a first TDD displayable control option to which the caller responds by generating a predefined communication signal for transmission over the network to the central location; automatically processing a received communication signal representative of a selected control option according to a predefined control matrix, the processing of a selected option including retrieving one of a plurality of separately addressed digitally encoded TDD displayable signals for transmission to the caller's TDD over the network, the retrieved signal consisting of either a TDD displayable message or a second TDD displayable control option; and transmitting the retrieved TDD displayable signal over the network to the caller's TDD for display.

It will be observed from the above description that the present invention satisfies an important need, i.e., providing automated telephone communication for hearing-impaired individuals. In particular, the system (and method) of the present invention provides deaf callers with automated attendant, voice mail (i.e., TDD-mail), text retrieval, transaction processing, database searching, etc. The system is also advantageously implemented with presently available commercial technologies.

Although several embodiments have been illustrated in the accompanying drawings and described in the foregoing detailed description, it will be understood that the invention is not limited to the particular embodiments discussed herein but is capable of numerous rearrangements, modifications and substitutions without departing from the scope of the invention. For example, the concepts comprising the present invention could be implemented within a limited vocabulary automated-relay service. The following claims are intended to encompass all such modifications.

APPENDIX A

```
MESSAGE MATRIX 'TDD1.MTX'
* before Current Event indicates tone message
? before Current Event indicates missing message
d before Current Event indicates a dummy message
+ after R indicates that a description message exists
```

| Event Description | Current Event | r=1 | r=2 | r=3 | r=4 | r=5 | r=6 | r=7 | r=8 | r=9 | r=0 | blank |
|---|---|---|---|---|---|---|---|---|---|---|---|---|
| Line Assignments | | | | | | | | | | | | 1 |
| | d 1 | 51 | 1 | 26 | | | | | | | 1 | ON |
| | d 2 | 51 | 1 | 26 | | | | | | | 1 | ON |
| | d 3 | 51 | 1 | 26 | | | | | | | 1 | ON |
| | d 4 | 51 | 1 | 26 | | | | | | | 1 | ON |
| | d 5 | 51 | 1 | 26 | | | | | | | 1 | ON |
| | d 6 | 51 | 1 | 26 | | | | | | | 1 | ON |
| | d 7 | 51 | 1 | 26 | | | | | | | 1 | ON |
| | d 8 | 51 | 1 | 26 | | | | | | | 1 | ON |
| | d 9 | 51 | 1 | 26 | | | | | | | 1 | ON |
| | d 10 | 51 | 1 | 26 | | | | | | | 1 | ON |
| | d 11 | 51 | 1 | 26 | | | | | | | 1 | ON |

| Event Description | Current Event | r=1 | r=2 | r=3 | r=4 | r=5 | r=6 | r=7 | r=8 | r=9 | r=0 | blank |
|---|---|---|---|---|---|---|---|---|---|---|---|---|
| d | 12 | 51 | 1 | 26 | | | | | | | 1 | ON |
| d | 13 | 51 | 1 | 26 | | | | | | | 1 | ON |
| d | 14 | 51 | 1 | 26 | | | | | | | 1 | ON |
| d | 15 | 51 | 1 | 26 | | | | | | | 1 | ON |
| d | 16 | 51 | 1 | 26 | | | | | | | 1 | ON |
| d | 17 | 55 | 1 | 26 | | | | | | | 1 | ON |
| d | 18 | 55 | 1 | 26 | | | | | | | 1 | ON |
| d | 19 | 55 | 1 | 26 | | | | | | | 1 | ON |
| d | 20 | 55 | 1 | 26 | | | | | | | 1 | ON |
| d | 21 | 55 | 1 | 26 | | | | | | | 1 | ON |
| d | 22 | 55 | 1 | 26 | | | | | | | 1 | ON |
| d | 23 | 55 | 1 | 26 | | | | | | | 1 | ON |
| d | 24 | 55 | 1 | 26 | | | | | | | 1 | ON |
| d | 25 | 55 | 1 | 26 | | | | | | | 1 | ON |
| d | 26 | 55 | 1 | 26 | | | | | | | 1 | ON |
| d | 27 | 55 | 1 | 26 | | | | | | | 1 | ON |
| d | 28 | 55 | 1 | 26 | | | | | | | 1 | ON |
| d | 29 | 888 | 1 | 26 | | | | | | | 1 | ON |
| d | 30 | 888 | 1 | 26 | | | | | | | 1 | ON |
| d | 31 | 158 | 1 | 26 | | | | | | | 1 | ON |
| d | 32 | 158 | 1 | 26 | | | | | | | 1 | ON |
| d | 39 | P99 | P606 | | | | | | | | | Z1 |
| havent responded | 40 | 39 | | | | | | | 5 | 3 | | A99 |
| nysd auto system | 41 | 42 | | | | | | | | | | 42 |
| d | 42 | 64 | 63 | | | | 8888 | 1700 | | | | X |
| d | 47 | 50 | 49 | 48 | 60 | 60 | 60 | 60 | 60 | 60 | 60 | M0 |
| Holiday | 48 | 64 | | | | | | | | | | 64 |
| Bad weather | 49 | 64 | | | | | | | | | | 64 |
| Emergency | 50 | 64 | | | | | | | | | | 64 |
| d | 51 | 52 | 53 | 54 | | | 1200 | 1800 | 2359 | | | X |
| Good Morning | 52 | 178 | | | | | | | | | | 178 |
| Good Afternoon | | | | | | | | | | | | 178 |

| Event Description | Current Event | r=1 | r=2 | r=3 | r=4 | r=5 | r=6 | r=7 | r=8 | r=9 | r=0 | blank |
|---|---|---|---|---|---|---|---|---|---|---|---|---|
| d | 162 | 74 | T) | 20 | | | | | | | | |
| d | 163 | 89 | T) | 20 | | | | | | | | |
| d | 164 | 98 | COPY | 111 | T) | | | | | | | |
| No Operator | 165 | 115 | | | | | | | | | | 115 |
| No Operator | 166 | 119 | | | | | | | | | | 119 |
| No Operator | 167 | 125 | | | | | | | | | | 125 |
| No Operator | 168 | 131 | | | | | | | | | | 131 |
| No Operator | 169 | 138 | | | | | | | | | | 138 |
| No Operator | 170 | 147 | | | | | | | | | | 147 |
| No Operator | 171 | 981 | | | | | | | | | | 981 |
| 7# disconnect (blnk)# | 172 | 117 | T1 | 23 | | | A99 | | | | | 117 |
| 7# disconnect (blnk)# | 173 | 129 | T1 | 23 | | | A99 | | | | | 129 |
| 7# disconnect (blnk)# | 174 | 136 | T1 | 23 | | | A99 | | | | | 136 |
| 7# disconnect (blnk)# | 175 | 977 | T1 | 23 | | | A99 | | | | | 977 |
| Please Hold... | 176 | 39 | | | | | | | | | | 39 |
| need instructs? # | 178 | 180 | 179 | | | 155 | | 800 | | | | 39 |
| d | 179 | 65 | 66 | | | | | | | | | Z1 |
| instructs to use | 180 | 179 | | | | | | | | | | 179 |

| Description | | Current | r=1 | r=2 | r=3 | r=4 | r=5 | r=6 | r=7 | r=8 | r=9 | r=0 | blank |
|---|---|---|---|---|---|---|---|---|---|---|---|---|---|
| sore instructs | d | 181 | 79 | COPY | 201 | T) | | | | | | | |
| sore onstructs | d | 182 | 79 | COPY | 202 | T) | | | | | | | |
| sore | d | 183 | 79 | COPY | 203 | T) | | | | | | | |
| tdd bullentin board | * | 200 | 201 | 202 | 228 | 228 | 179 | 200 | | | | | 48 |
| care of batteries | * | 201 | 201 | 200 | 179 | | | | | | | | 48 |
| publishers corner | * | 202 | 201 | 200 | 179 | | | | | | | | 48 |
| future of tdd info | | 220 R+ | 221 | | | | | | | 1 | 60 | 4 | 221 |
| question 2 | | 221 R+ | 222 | | | | | | | 1 | 60 | 4 | 222 |
| dirad address | * | 222 | 222 | 179 | | | | | | | | | 48 |
| dirad atext | | 228 R+ | 221 | | | | | | | 1 | 60 | 4 | 221 |
| sore info or sain | * | 245 | 200 | 179 | | | | | | | | | 48 |
| ord info=1,sain N=2 | * | 300 | 310 | 179 | | | | | | | | 171 | 48 |
| enter name | | 310 R+ | 312 | | | | | | | | 30 | 4 | 311 |
| do again | | 311 RR | 312 | | | | | | | | 30 | 4 | 48 |
| adress | | 312 R+ | 314 | | | | | | | | 45 | 4 | 313 |
| didnt get | | 313 RR | 314 | | | | | | | | 45 | 4 | 48 |
| phone number | | 314 R+ | 316 | | | | | | | | 30 | 4 | 315 |
| didnt get | | 315 RR | 316 | | | | | | | | 30 | 4 | 48 |
| application? | | 316 R+ | 318 | | | | | | | | A4 | 4 | 317 |
| didnt get | | 317 RR | 318 | | | | | | | | A4 | 4 | 48 |
| thank you | | 318 | 179 | | | | | | | | | | 179 |
| Company dist no | * | 700 | 704 | T3 | DIST | 7 | [13] | | | | | 702 | A99 |
| Personal no. | * | 701 | 704 | T3 | DIST | 8 | [13] | [10] | | | | 702 | A99 |
| invallid list no. | | 702 | 703 | S | 13 | 702 | | | | | | | 703 |
| | d | 703 | 809 | 870 | | | | | | | | | Z6 |
| Editing list no... | | 704 | 705 | S | 704 | 13 | | | | | | | 705 |
| 1=add;2=del;3=purge | * | 705 | 706 | 716 | 725 | | | | | | | 703 704 | A99 |
| LC to add | | 706 | 708 | | | | | | | | | | 708 |
| Next LC to add | | 707 | 708 | | | | | | | | | | 708 |
| | d | 708 | 983 | 6 | 28 | | | | | 1 | | | ON |
| | d | 709 | 711 | 715 | A99 | 715 | 711 | 704 | 715 | | | | Z9 |
| | d | 710 | 712 | 715 | A99 | 715 | 712 | 704 | 715 | | | | Z9 |
| | d | 711 | ... | T) | DIST | . | [13] | [10] | | | | 714 | 714 |
| | d | 712 | 713 | T) | DIST | 3 | [13] | | | | | | 714 |

| Event Description | | Current Event | r=1 | r=2 | r=3 | r=4 | r=5 | r=6 | r=7 | r=8 | r=9 | r=0 | blank |
|---|---|---|---|---|---|---|---|---|---|---|---|---|---|
| Not In | | 110 | 136 | S | [10] | NES | 110 | | | | | | 136 |
| | d | 111 | 975 | 979 | | | | | | | | | Z1 |
| No Answer | | 112 | 113 | | | | | | | | | | 113 |
| | d | 113 | 114 | 115 | | | | | | | | | Z1 |
| 1=P);2=new;3=vx;0=Op | * | 114 | P) | 81 | 975 | | 114 | | 141 | | 141 | 176 | A99 |
| 1=P);2=new;3=vx | * | 115 | P) | 81 | 979 | | 115 | | 141 | | 141 | 165 | A99 |
| | d | 116 | 117 | 120 | 81 | 81 | 81 | 81 | 81 | 81 | 81 | 81 | X3 |
| | d | 117 | 118 | 119 | | | | | | | | | Z1 |
| EXT/NAME/DEPT'S/ 0 | * | 118 | 120 | 81 | 98 | | 118 | | 172 | 67 | 800 | 176 | A99 |
| EXT/NAME/DEPT'S/RPT | * | 119 | 120 | 81 | 98 | | 119 | | 172 | 67 | 800 | 166 | A99 |
| EXTENSION | * | 120 | 139 | T3 | E7 | 5 | | | | | | 126 | 71 |
| Busy | | 121 | 123 | | | | | | | | | | 123 |
| No Answer | | 122 | 123 | | | | | | | | | | 123 |
| | d | 123 | 124 | 125 | | | | | | | | | Z1 |
| 1=P);2=new;3=vx;0=Op | * | 124 | P) | 118 | 129 | | 124 | | 142 | | 142 | 176 | A99 |
| 1=P);2=new;3=vx;0=Op | * | 125 | P) | 118 | 129 | | 125 | | 142 | | 142 | 167 | A99 |

| Event Description | | Current Event | r=1 | r=2 | r=3 | r=4 | r=5 | r=6 | r=7 | r=8 | r=9 | r=0 | blank |
|---|---|---|---|---|---|---|---|---|---|---|---|---|---|
| | d | 126 | 121 | T) | EX | | | | 122 | | | | |
| | d | 127 | 128 | T) | #8 | | | | | | | | |
| | d | 128 | 975 | 979 | | | | | | | | | Z1 |
| | d | 129 | 130 | 131 | | | | | | | | | Z1 |
| I'M SORRY/DEP'T LIST | * | 130 | 133 | 67 | | 130 | | 172 | | | 176 | | A99 |
| I'M SORRY/ GENERAL | * | 131 | 133 | 67 | 82 | 131 | | 172 | | | 168 | | A99 |
| Please Hold... | | 132 | 126 | | | | | | | | | | 126 |
| | d | 133 | 979 | COPY | 100 | #8 | | | | | | | |
| Unknown Name | | 134 | 135 | | | | | | | | | | 135 |
| | d | 135 | 977 | 981 | | | | | | | | | Z1 |
| | d | 136 | 137 | 138 | | | | | | | | | Z1 |
| 2=new;3=vm;0=Oper. | * | 137 | 137 | 81 | 975 | 137 | | 173 | | | 176 | | A99 |
| 2=new;3=vm | * | 138 | 81 | | 979 | 138 | | 173 | | | 169 | | A99 |
| | d | 139 | 140 | T) | #8 | | | | | | | | |
| | d | 140 | 106 | 106 | 106 | 106 | 106 | 105 | 105 | 105 | 105 | 105 | M2 |
| 7# or 9# = hangup | * | 141 | 113 | T1 | #3 | | | A99 | | | | 113 | |
| 7# or 9# = hangup | * | 142 | 123 | T1 | #3 | | | A99 | | | | 123 | |
| | d | 143 | 881 | T) | L3 | | | | | | | 882 | |
| | d | 144 | 113 | T) | L3 | | | | | | | 145 | |
| | d | 145 | 146 | 147 | | | | | | | | | Z1 |
| TRY AGAIN/ASSISTANCE | * | 146 | P) | 81 | | 146 | | 148 | | 148 | 176 | | A99 |
| TRY EXTENSION AGAIN | * | 147 | P) | 81 | | 147 | | 148 | | 148 | 170 | | A99 |
| 7# or 9# = hangup | * | 148 | 145 | T1 | #3 | | | A99 | | | | 145 | |
| | d | 149 | 846 | T) | L3 | | | | | | | 845 | |
| USER CODE/VMAIL | * | 150 | 151 | T# | L0 | | | | | | | 957 | A99 |
| | d | 151 | 866 | T) | L3 | 1 | | | | | | 152 | |
| USER CODE ON LIST | | 152 | 866 | | | | | | | | | | 866 |
| ENTER USER CODE | * | 153 | 867 | T# | L3 | 2 | | | | | 154 | | A99 |
| USER CODE NOT ON LST | | 154 | 867 | | | | | | | | | | 867 |
| ENTER PASSWORD | * | 155 | 156 | T# | L4 | | | | | | | A99 | A99 |
| ENTER RSPNS DIR # | * | 156 | B50 | T1 | #8 | 9 | | | | | | 157 | A99 |
| INVALID RES DIR | | 157 | 156 | | | | | | | | | | 156 |
| | d | 158 | 161 | 159 | 159 | 159 | 159 | 159 | 161 | 161 | | | W |
| | d | 159 | 161 | 160 | | | | 8800 | 1700 | | | | X |
| | d | 160 | 67 | 1 | Z1 | | | | | | 1 | | ON |
| | d | 161 | 67 | 2 | Z1 | | | | | | 1 | | ON |

| Event Description | | Current Event | r=1 | r=2 | r=3 | r=4 | r=5 | r=6 | r=7 | r=8 | r=9 | r=0 | blank |
|---|---|---|---|---|---|---|---|---|---|---|---|---|---|
| Good Evening | | 54 | 178 | | | | | | | | | | 178 |
| | d | 55 | 56 | 57 | 58 | | | 1200 | 1800 | 2359 | | | X |
| Good Morning | | 56 | 47 | | | | | | | | | | 47 |
| Good Afternoon | | 57 | 47 | | | | | | | | | | 47 |
| Good Evening | | 58 | 47 | | | | | | | | | | 47 |
| | d | 60 | 64 | 64 | 64 | 64 | 64 | 64 | 64 | 64 | 64 | 61 | M1 |
| | d | 61 | 64 | 62 | 62 | 62 | 62 | 62 | 64 | 48 | | | W |
| | d | 62 | 63 | 64 | | | | 8800 | 1700 | | | | X |
| | d | 63 | 178 | 1 | Z1 | | | | | | 1 | | ON |
| | d | 64 | 178 | 2 | Z1 | | | | | | 1 | | ON |
| main menu | * | 65 | 116 | 200 | 228 | 65 | | 155 | 864 | 67 | 800 | 176 | 176 |
| Press 1, Night | * | 66 | 116 | 200 | 228 | 66 | | 155 | 864 | 67 | 800 | 133 | 133 |
| get name | | 67 | 68 | | | | | | | | | | 68 |
| | d | 68 | 983 | 1 | Z8 | | | | | | 1 | | ON |
| | d | 69 | 73 | 72 | 71 | 70 | 162 | 78 | 72 | | | | Z9 |

| | | | | | | | | | | | |
|---|---|---|---|---|---|---|---|---|---|---|---|
| | d | 70 | | T) | IL2 | | 98 | | | 131 | 48 |
| | d | 71 | 176 | 133 | | | | | | | 21 |
| | d | 72 | 74 | T) | E8 | 5 | | | | 78 | 134 |
| | d | 73 | 74 | T) | 48 | | | | | | |
| | d | 74 | 88 | 88 | 75 | 88 | 75 | 88 | 75 | 75 | 75 | 75 | M2 |
| echo name (blank) | | 75 | 88 | S | [48] | NES | | | | | 88 |
| | d | 79 | 104 | T) | 48 | | | | | | |
| | d | 80 | 975 | 979 | | | | | | | 21 |
| | d | 81 | 82 | 2 | Z2 | | | | 1 | | ON |
| Enter Name, 111 Dept | | 82 | 83 | | | | | | | | 83 |
| | d | 83 | 983 | 2 | Z8 | | | | 1 | | ON |
| | d | 84 | 88 | 87 | 85 | 78 | 163 | 78 | 87 | | 79 |
| | d | 85 | 86 | 71 | | | | | | | Z2 |
| | d | 86 | 82 | 2 | Z2 | | | | 1 | | ON |
| | d | 87 | 89 | T) | E8 | 5 | | | | 78 | 134 |
| | d | 88 | 89 | T) | 48 | | | | | | |
| | d | 89 | | T) | IL2 | | 98 | | | 104 | |
| Department listing | * | 90 | 91 | 92 | 93 | 94 | 90 | | | 39 | 48 |
| admin offices | * | 91 | 95 | 96 | 97 | 98 | 99 | 91 | | 39 | 48 |
| health offices | * | 92 | 100 | 101 | 102 | 92 | | | | 39 | 48 |
| dorms | * | 93 | 103 | 101 | 93 | | | | | 39 | 48 |
| schools | * | 94 | 102 | 103 | 94 | | | | | 39 | 48 |
| | d | 95 | 79 | COPY | 101 | T) | | | | | |
| | d | 96 | 79 | COPY | 102 | T) | | | | | |
| | d | 97 | 79 | COPY | 103 | T) | | | | | |
| | d | 98 | 79 | COPY | 104 | T) | | | | | |
| | d | 99 | 79 | COPY | 105 | T) | | | | | |
| | d | 100 | 79 | COPY | 106 | T) | | | | | |
| | d | 101 | 79 | COPY | 107 | T) | | | | | |
| | d | 102 | 79 | COPY | 108 | T) | | | | | |
| | d | 103 | 79 | COPY | 109 | T) | | | | | |
| | d | 104 | 106 | 105 | 106 | 106 | 105 | 105 | 106 | 105 | 105 | 105 | M2 |
| Transfer to... | - | 105 | 106 | S | 105 | [48] | NES | | | | 106 |
| | d | 106 | 107 | 108 | | | | | | | 21 |
| | d | 107 | 109 | T) | E5 | | | | | 112 | 108 |
| | d | 108 | 109 | T) | F9 | | 111 | 110 | | 112 | 78 |
| Busy | | 109 | 113 | | | | | | | | 112 |

APPENDIX B

```
40    U HAVE NOT RESPONDED     IF U WISH TO USE THIS
      MACHINE PUSH   UR SPACE BAR 3 TIMES     GA

52    GOOD MORNING U HAVE REACHED   NYSSD AUTOMATED
      SYSTEM FOR TTY/TTD USERS

53    GOOD AFTERNOON U HAVE REACHED   NYSSD AUTOMATED
      SYSTEM FOR TTY/TTD USERS

54    GOOD EVENING U HAVE REACHED   NYSSD AUTOMATED
      SYSTEM FOR TTY/TTD USERS

65    START POINT -- TO TRANSFER UR CALL TO AN EXT OR
      DEPT PUSH 1   FOR A BULLETIN BOARD PUSH 2     FOR
```

INFORMATION ON TECHNOLOGY PUSH 3     TO REPEAT THIS MSG PUSH 4     FOR OPER PUSH 0     GA

66   SAME AS 65

67   PUSH FIRST 3 LETTER OF PERSON'S LAST NAME WHOM U ARE TRYING TO REACH     GA

82   IF U KNOW NAME OF PERSON U R TRYING TO REACH PUSH FIRST 3 LETTER OF LAST NAME     FOR A LIST OF EXTS PUSH 111     GA

90   DEPTS -- FOR ADMIN OFFICES PUSH 1     FOR HEALTH OFFICES PUSH 2     FOR DORMS PUSH 3     FOR SCHOOLS PUSH 4     TO REPT THIS MSG PUSH 5     FOR OPER PUSH 0     GA

91   ADMIN OFFICES -- FOR SUPERINTENDENT PUSH 1     FOR PRINCIPAL PUSH 2     FOR DEAN OF STUDENTS PUSH 3     FOR GUIDANCE PUSH 4     FOR BUS OFFICE PUSH 5     TO REPT THIS MSG PUSH 6     FOR OPER PUSH 0     GA

92   HEALTH OFFICES -- FOR PSYCHOLOGIST PUSH 1     FOR HEALTH CENTER PUSH 2     FOR AUDIOLOGIST PUSH 3     TO REPT THIS MSG PUSH 4     FOR OPER PUSH 0     GA

93   DORMS     FOR HS DORM PUSH 1     FOR ELEM DORM PUSH 2     TO RPT THIS MSG PUSH 4     FOR OPER PUSH 0     GA

94   SCHOOLS -- FOR SECONDARY HS PUSH 1     FOR ELEM PUSH 2     TO RPT THIS MSG PUSH 3     FOR OPER PUSH 0     GA

105  TRANSFERRING TO

109  THAT EXT IS BUSY

110  IS NOT IN NOW

112  THERE IS NO ANSWER

114  TO TRY THAT EXT AGAIN PUSH 1     FOR A DIFFERENT EXT PUSH 2     TO LVE A MSG PUSH 3     TO RPT THIS MSG PUSH 5     FOR AN OPER PUSH 0     GA

115  TO TRY THAT EXT AGAIN PUSH 1     FOR A DIFFERENT EXT PUSH 2     TO LVE A MSG PUSH 3     TO RPT THIS MSG PUSH 5     FOR AN OPER PUSH 0     GA

118  IF U KNOW EXT THAT U WANT PUSH 1     IF U KNOW NAME OF PERSON U WANT PUSH 2     IF U WOULD LIKE A LIST OF DEPARTMENTS PUSH 3     TO RPT THIS MSG PUSH 5     FOR AN OPER PUSH 0     GA

120  PUSH THE EXT U R TRYING TO REACH    GA

121  THAT EXT IS BUSY

122  THERE IS NO ANSWER

124 & 125

131  U HAVE ENTERED AN INVALID PERSON OR EXT    TO LVE A MSG IN GENERAL TDD MAIL BOX PUSH 1    TO TRY A DIFFERENT PERSON  PUSH 2    FOR A DIFFERENT EXT PUSH 3    TO RPT THIS MSG PUSH 5    FOR OPER PUSH 0   GA

132  PLS HD WHILE I CONNECT U

134  INVALID NAME

137  TO TRY THAT EXT AGAIN PUSH 1    FOR DIFFERENT EXT PUSH 2   TO LVE A MSG PUSH 3    FOR AN OPER PUSH 0   GA

171  THERE IS NO OPER AVAILABLE

176  PLS HD

178  IF Y NEED INSTRUCTIONS ON USING MACHINE PUSH 1 ON UR TOUCH TONE PHONE    TO SKIP INSTRUCTIONS PUSH 2    IF U HAVE ROTARY PHONE PLS WAIT A MOMENT    GA

180  THIS MACHINE WAS DEVELOPED BY DIRAD TECHNOLOGIES AND WILL ALLOW U TO TRANSFER UR CALL TO VARIOUS PEOPLE OR EXTS   LVE PERSONAL MSGS AND OBTAIN INFO FROM BULLETIN BOARD   MACHINE IS OPERATED BY KEYS ON TOUCH TONE PHONE
                              ( FORCED BRANCH TO 65)

970  UR RECORDING A TDD MAIL MSG    TO REVIEW UR MSG PUSH 1    TO RE RECORD PUSH 3    TO DISCARD PUSH STAR KEY    TO SAVE PUSH POUND KEY    FOR OPER PUSH 0    TO RPT THIS MSG PUSH 5    GA

790  IF CORRECT PUSH 1    TO RETRY PUSH 2    TO RETURN TO TDD MAIL OPTIONS PUSH 9    TO RPT THIS MSG PUSH 0    GA

794  BEGIN TYPING AT GA    TO REVIEW UR MSG PUSH 1 FINISHED BY PRESSING POUND KEY    GA

795  RECORD UR REDIRECTED COMMENT AT GA    FINISH BY PUSHING POUND KEY    GA

791  IF CORRECT PUSH 1    TO RETRY PUSH 2    TO
     CONTINUE SEEING UR MSGS PUSH 9   TO RPT THIS MSG
     PUSH 0    GA

783  UR REPLYING TO

786  UR REDIRECTING A MSG

794  BEGIN TYPING AT GA    TO REVIEW UR MSG PUSH 1
     FINISH BY PUSHING POUND KEY    GA

795  TYPE YOUR REDIRECT COMMENT MSG AT THE GA
     FINISHED BY PUSHING POUND KEY    GA

808  FOR PERSONAL OPTIONS PUSH 4    TO LVE A MSG FOR
     ANOTHER USER PUSH 5 TO EXIT TDD MAIL PUSH 9    TO
     PRT THIS MSG PUSH 0    GA

970  UR RECORDING A TDD MAIL MSG    TO REVIEW UR MSG
     PUSH 1    TO RE RECORD PUSH 3    TO DISCARD PUSH
     STAR KEY    TO SAVE PUSH POUND KEY FOR OPER PUSH
     0    TO RPT THIS MSG PUSH 5    GA

APPENDIX C

Helpful Hints - Common TTY/TTD Terms

| | |
|---|---|
| TDD | telecommunication Device for the Deaf |
| GA | Go Ahead, your turn to type |
| SK | Stop Key, meaning end of conversation |
| CUZ | Because |
| HD | Hold, please |
| PLS | Please |
| OIC | Oh, I see |
| U | You |
| UR | Your |
| CD | Could |
| Q | Question mark |
| MTG | Meeting |
| R | Are |
| NBR | Number (Also NU) |
| OPR | Operator |
| CUL | See you later |
| SHD | Should |
| TMW | Tomorrow |

APPENDIX D

TDD MAIL OPTIONS

Dial TDD/ in system - when system answers, Press 9. The first thing TDD Mail will tell you is how many new and old message are in your mailbox.

Remember, to use the system successfully, carefully read menus, and wait for the GA (Go Ahead)

You will then be prompted to select one of the following Options. Make your selection by pressing the appropriate key on your touch tone phone.

- 1     Print new messages.
- 2     Print old messages.
- 3     Print discarded messages.
- 4     Personal Options.
- 5     Leave a message for another user.
- 9     Exit TDD Mail. Terminate call.
- 0     Reprint this menu.

PRINTING

To print old, new or discarded messages, simply select the appropriate option from the TDD Mail Option Menu.

The system will begin printing your messages, one at a time, in the order they arrive in your mailbox.

For messages sent today, only the time of the message will be printed. If the message was sent earlier, both the date and the time will be printed.

You may select any of the following options while the message is playing or at its completion:

- 1     Reprint current message
- 7     Leave a message for another user on the system.
- 9     Return to TDD Mail Options
- #     To save the message and continue.
- *     To discard the message and continue.

PERSONAL OPTIONS

When you access your mailbox, selection option 4 from the TDD Mail Options menu:

- 1     Print new messages.
- 4     Personal Options.

5 Leave a message for another user. Follow instructions.

9 Exit TDD Mail. Terminate call.

Q Repeat this Menu.

You will see the choices for reviewing and changing your personal options.

1 Review or change your current office status.

2 Review or change your current greeting.

3 Review or change your current printed name.

4 Change your extension.

5 Change your password.

9 Return to TDD Mail options.

Office status:

1 To review.

2 To change.

9 To return to TDD Mail options.

After you have entered a change, you will be prompted to press:

1 To save.
2 To rerecord.

9 Exit without saving.

OFFICE STATUS

TDD Mail offers three choices for office status:

0 In.

1 Out.

2 Transfer to TDD Mail.

If you select IN, the Automated Attendant will transfer incoming calls to your office. If there is no answer, the caller will be prompted to leave a TDD Mail message.

If you select OUT, the Automated Attendant will tell the caller you are not in and prompt them to leave a message.

If you select TRANSFER to TDD Mail, callers will read your recorded greeting and then be prompted to leave a message.

GREETING

This is your personal greeting that will print for outside callers before they leave a message for you.

You may type anything you like. You may mention a time that you will be in or another number where you can be reached.

You will type the announcement you want read. Remember to end with the # sign. (Pound Sign)

PRINTED NAME

This is the typed name that is printed for callers when they enter your extension.

You will type the name you want read. Remember to end with the # sign.

EXTENSION

The Automated Attendant will use this extension to transfer calls. TDD Mail will use the extension to provide the message waiting light notification at your office, if your phone system supports this feature.

PASSWORD

You may change your TDD mailbox password. Follow menu.

PERSONAL LISTS

You may create up to ten personal lists, numbered 010 to 019, for groups you send messages to on a regular basis. For example, to send to all faculty, you would create a list containing each of their names and then simply use the list number when sending messages.

To create a list, select option 7 from the Personal Options menu then enter the number of the list you wish to create or change. Next you will be prompted to press:

1　To add a name to a list.

2  To delete a name from a list.

Enter the user code (first three letters of the last
name) for the first person you want on the list.
Once you have uniquely identified that individual and
confirmed that he is the one you want on the list,
you will be able to add a second name.  Continue
until you have added all the names you want.

To delete one or more names, follow the same steps.

To use the list when sending a message, simply use
the list number in place of a personal user code.

What is claimed is:

1. An interactive telephone communication system for connection to a two-way telephone subscriber network for automated processing of communication signals from a hearing-impaired person communicating therewith over the telephone subscriber network with a TDD coupled to said network, said system comprising:
 means for receiving communication signals from said hearing-impaired caller;
 a computer database containing a plurality of separately addressed digitally encoded TDD displayable messages;
 means for processing a received communication signal according to a predefined control matrix, said processing means including means for retrieving one of said separately addressed TDD displayable messages for transmission to said caller's TDD; and
 means for transmitting said retrieved TDD displayable message to said caller's TDD for display, wherein a first transmitted message includes an initial control option, said hearing-impaired caller selecting in response a particular option by transmitting a predefined communication signal to said system.

2. The interactive system of claim 1, wherein said TDD is coupled to a conventional touch-tone type telephone and said telephone is connected to said telephone subscriber network, and wherein said communication signals comprise DTMF telephone signals generated by said touch-tone type telephone.

3. The interactive system of claim 2, wherein said computer database contains an initial TDD displayable greeting message and wherein said processing means, upon receiving a telephone call from said caller, retrieves and transmits said greeting message to said caller's TDD for display.

4. The interactive system of claim 2, wherein said messages stored in said computer database are coded in one of Baudot and ASCII which when decoded by a TDD include abbreviated words displayable for viewing on the TDD.

5. The interactive system of claim 2, wherein said receiving means and said transmitting means include an A/D, D/A converter interface for converting a received DTMF telephone signal from an analog signal to a digital signal for processing by said processing means and for converting a retrieved TDD displayable message from a digital signal to an analog signal for transmission over said network to said caller's TDD.

6. The interactive system of claim 5, further comprising means for storing a TDD displayable message in said computer database.

7. The interactive system of claim 6, wherein said message storing means includes a TDD unit coupled to an audio interface unit, said audio interface unit being connected to said A/D, D/A converter interface, said control matrix of said processing means allowing computer storage of a message input to said converter interface through said audio interface unit from said associated TDD unit, said converter providing digital encoding of said inputted TDD displayable message prior to storage.

8. The interactive system of claim 7, wherein said TDD unit coupled to said audio interface unit includes a storage buffer, said buffer being capable of holding an inputted message to be stored in said system, said message being controllably released from said buffer at a substantially uniform rate.

9. The interactive system of claim 2, wherein said separately addressable digitally encoded TDD displayable messages include text messages, said text messages being selectively retrievable and viewable by said hearing-impaired individual.

10. The interactive system of claim 2, further comprising a plurality of addressable telephone extensions, and means for routing a telephone call to one of said plurality of extensions.

11. The interactive system of claim 10, wherein said routing means includes a PBX switching device.

12. The interactive system of claim 11, further comprising a plurality of system TDDs, each system TDD being coupled to a different one of said plurality of telephone extensions.

13. The interactive system of claim 11, further comprising means for storing a message from said hearing-impaired caller for a particular telephone extension.

14. The interactive system of claim 13, wherein said stored telephone message comprises a digitally encoded TDD displayable message.

15. The interactive system of claim 2, wherein said system is capable of accommodating multiple independent telephone calls simultaneously.

16. The interactive system of claim 2, wherein said stored digitally encoded TDD displayable messages comprise one of digitally encoded Baudot signals and digitally encoded ASCII signals.

17. The interactive system of claim 1, wherein said TDD is coupled to one of a conventional rotary type telephone and a touch-tone type telephone, and said telephone is connected to said network, and wherein said communication signals comprise one of rotary telephone signals, DTMF signals and TDD displayable signals, said system further comprising means for converting a received rotary telephone signal or TDD displayable signal into a DTMF telephone signal, and wherein said processing means processes the converted DTMF telephone signal according to the predefined control matrix.

18. The interactive system of claim 17, wherein said means for converting said rotary telephone signal or TDD displayable signal to said DTMF telephone signal includes a dependent voice recognition card coupled to receive said rotary telephone signal or said TDD displayable signal.

19. The interactive system of claim 17, wherein said receiving means and said transmitting means include an A/D, D/A converter interface for digitizing a converted DTMF telephone signal for processing by said processing means and for converting a retrieved TDD displayable message from a digital signal to an analog signal for transmission to said caller's TDD over said telephone subscriber network.

20. The interactive system of claim 19, further comprising a plurality of telephone extensions and means for routing a telephone call to one of said plurality of extensions, said routing means including a PBX switching device.

21. The interactive system of claim 20, further comprising a plurality of system TDDs, each system TDD being coupled to one of said plurality of extensions.

22. The interactive system of claim 21, wherein said system is capable of accommodating multiple independent telephone calls from hearing-impaired individuals simultaneously.

23. An automated method at a central location connected to a two-way telephone subscriber network for interactively responding to a telephone call from a hearing-impaired person communicating therewith over said telephone subscriber network using a TDD coupled to said network, said method comprising the steps of:

receiving at said central location a communication signal from said hearing-impaired caller;

initially transmitting over said network a TDD displayable message to said caller's TDD as an acknowledgement of connection to said central location;

transmitting over said network a first TDD displayable control option to said caller's TDD, said hearing-impaired caller selecting a desired control option by generating a predefined communication signal for transmission over said network to said central location;

automatically processing a received communication signal representative of a selected control option according to a predefined control matrix, said processing of said selected option including retrieving from an associated database one of a plurality of separately addressed digitally encoded TDD displayable signals for transmission to the caller's TDD over said network, said retrieved signal comprising one of a TDD displayable message and a second TDD displayable control option; and transmitting said retrieved TDD displayable signal over said telephone subscriber network to said caller's TDD.

24. The method of claim 23, wherein said caller's TDD is coupled to a conventional touch-tone type telephone and said telephone is connected to said subscriber network, and wherein said receiving step includes receiving at said central location DTMF telephone signals from said hearing-impaired caller.

25. The method of claim 24, wherein said receiving step includes converting said DTMF signals to digital signals for processing and wherein said transmitting step includes converting retrieved digitally encoded TDD displayable signals to analog tone signals for transmission over said network.

26. The method of claim 25, further comprising the step of providing said hearing-impaired caller with a control option for switching between one of a plurality of telephone extensions at said central location.

27. The method of claim 23, wherein said caller's TDD is coupled to a conventional rotary type telephone and said rotary telephone is connected to said network, said receiving step including receiving at said central location one of rotary type telephone signals and TDD displayable signals from said hearing-impaired caller.

28. The method of claim 27, further comprising the step of converting a received rotary telephone signal or TDD displayable signal into a DTMF telephone signal, said processing step including processing the converted DTMF telephone signal according to the predefined control matrix.

29. The method of claim 28, further comprising the step of digitizing said converted DTMF telephone signal for processing.

30. The method of claim 29, further comprising the step of providing said hearing-impaired caller with a control option for switching the telephone call to one of a plurality of telephone extensions.

* * * * *